Sept. 10, 1963  J. B. CAMPBELL  3,103,090
SPECIFIC VEHICLE MOUNTING FOR GANG MOWER
Filed Aug. 5, 1960  3 Sheets-Sheet 1

Jerry B. Campbell
INVENTOR.

BY Lawrence A. O'Brien
and Harvey B. Jacobson
Attorneys

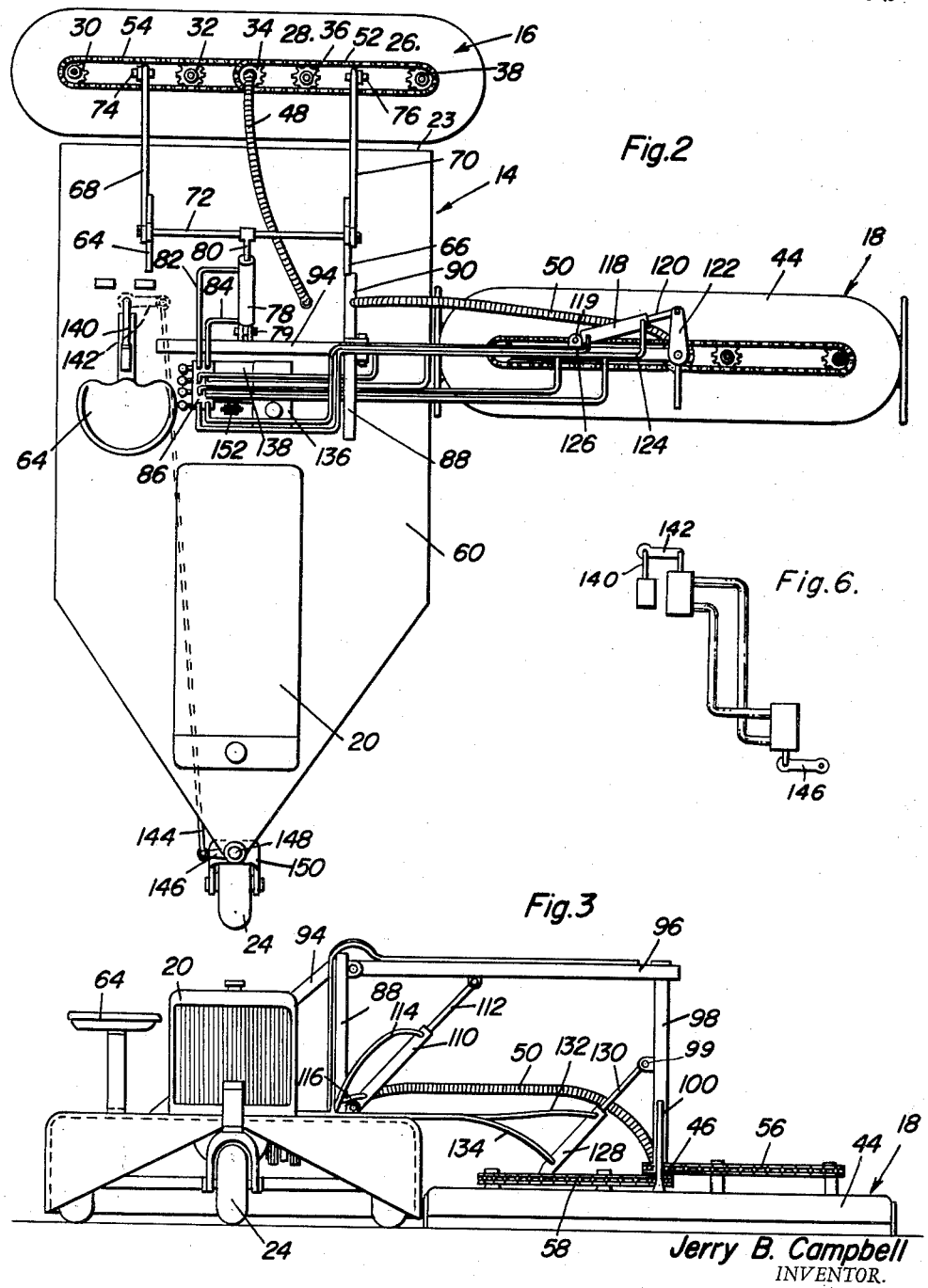

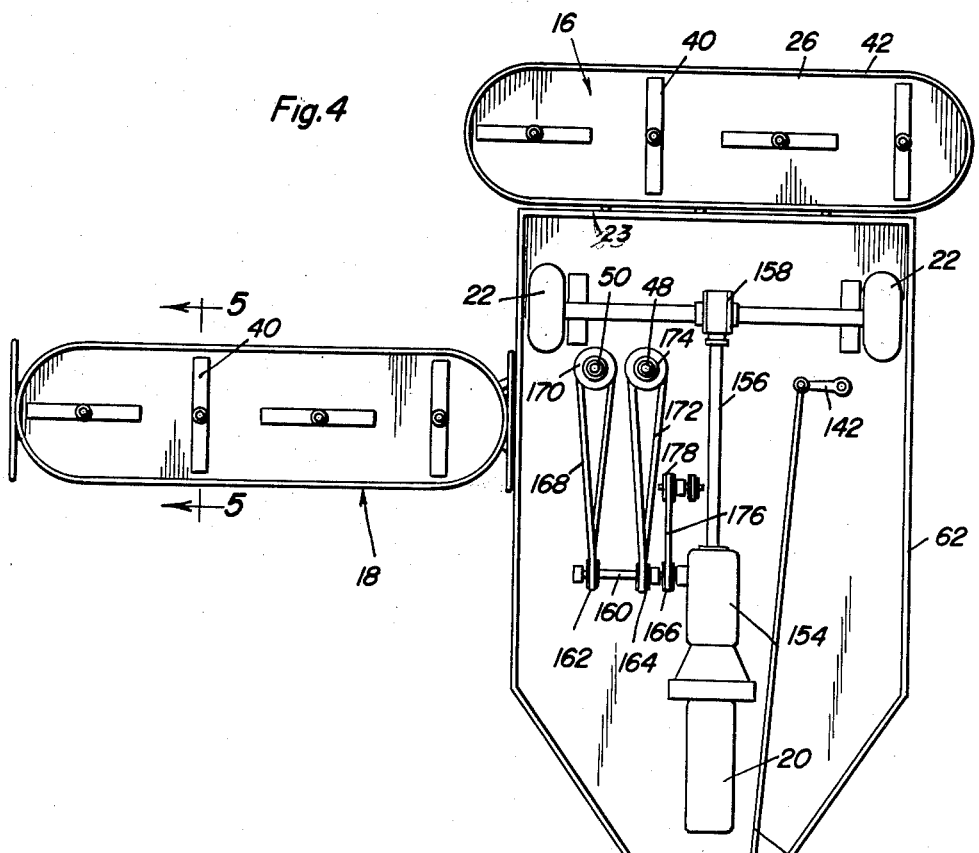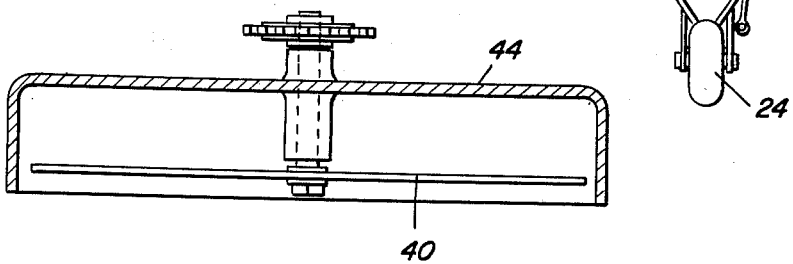

United States Patent Office 3,103,090
Patented Sept. 10, 1963

3,103,090
SPECIFIC VEHICLE MOUNTING FOR GANG MOWER
Jerry B. Campbell, Liberty, Tex., assignor of fifty percent to Robert J. Sutherlin, Liberty, Tex.
Filed Aug. 5, 1960, Ser. No. 47,861
3 Claims. (Cl. 56—6)

This invention relates to a special purpose mowing machine for cutting of grass growing on highway right-of-ways.

It will be appreciated that a special problem exists with respect to highways concerning the cutting of grass growing along the right-of-ways adjacent to the highway including the islands between the opposite traffic lanes of the highway and the strips bordering the shoulders of the highway. In cutting the grass growing along the aforementioned right-of-ways a considerable linear distance must be traversed by the mowing machine and hence the mowing machine should be capable of cutting a swath of grass sufficient to cover the linear strip constituting a highway right-of-way without requiring a plurality of cutting trips along the highway. Also, the mowing machine should be able to accommodate the irregularities of the right-of-way that often border a highway. Accordingly, the mowing machine must be able to accommodate itself for the cutting of grass growing along steep embankments, ditches, etc. Also, the mowing machine should be able to maneuver for the purpose of cutting along a curved path. In providing a mowing machine fulfilling the above-noted needs it will be necessary to provide a cutting blade arrangement of necessarily large extent and yet readily adjustable for accommodating the ground irregularities, said machine despite such large extent must be capable of easy maneuver and not susceptible to turning over. It is therefore the primary object of this invention to provide a machine having all of the attributes hereinbefore noted.

A further object of this invention is to provide a mowing machine fulfilling the above-noted requirements and thereby avoiding the uneconomical use of tractor powered grass mowers employing a plurality of special attachments in order to cope with the problems peculiar to the cutting of grass on highway right-of-ways.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the mowing machine illustrated in FIGURE 1.

FIGURE 3 is a rear elevational view of the mowing machine illustrated in FIGURE 1.

FIGURE 4 is a bottom plan view of the mowing machine illustrated in FIGURE 1.

FIGURE 5 is an enlarged sectional view taken through a plane indicated by section line 5—5 in FIGURE 4.

FIGURE 6 is a diagrammatic view of an alternate form of a hydraulic steering control.

Figure 1:
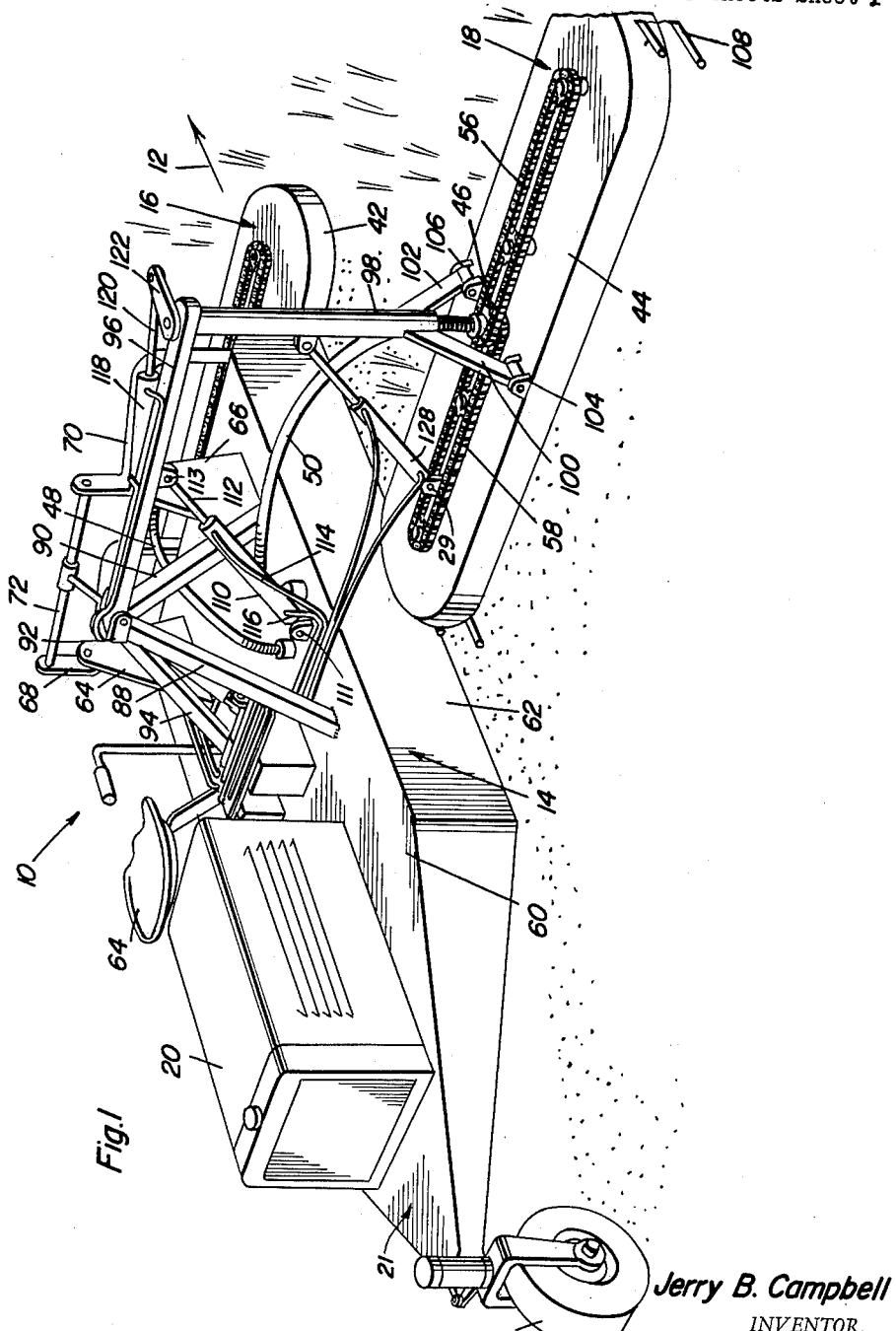
FIGURE 1 is a perspective view showing the mowing machine made in accordance with this invention in use.

Referring to the drawings in detail, the moving machine generally indicated by reference numeral 10 is shown in FIGURE 1 and is movable forwardly in the direction of arrow 12. The machine 10 comprises a vehicle frame generally indicated by reference numeral 14 with a forward cutter assembly 16 adjustably connected forwardly of the vehicle frame 14 and a side cutter assembly 18 adjustably connected to one lateral side of the vehicle frame 14. A power plant 20 is mounted on top of the vehicle frame adjacent its rear end 21 in order to provide the power for operating the cutter assemblies 16 and 18 and for adjustably positioning the cutter assemblies relative to the vehicle frame. The power plant 20 also provides the power for propelling the vehicle frame 14 by means of propelling wheels 22 located adjacent the forward longitudinal end 23 of the frame 14 as more clearly seen in FIGURE 4. Also disposed at the rear end of the vehicle frame 14 is a steering wheel assembly 24 completing a three-wheel support for the vehicle frame and enabling the vehicle frame to be easily maneuvered.

The cutter assemblies 16 and 18 are similar in construction to each other as far as the cutter casing, blade mounting and blade drive arrangements are concerned. For example, the forward cutter assembly 16 includes a casing 26 having a top side 28 which rotatably mounts a plurality of sprocket wheels 30, 32, 34, 36 and 38 as more clearly seen in FIGURE 2. Connected to each of the aforesaid sprocket wheels and disposed beneath the top portion 28 of the casing 26 are a plurality of rotary blades 40 which are preferably angularly spaced 90° with respect to each other as seen in FIGURE 4. The blades are confined within an apron 42 connected to the top portion 28 of the casing 26 and depending therefrom. The cutter assembly 18 similarly includes a casing 44 which rotatably mounts a plurality of sprocket wheels also connected to a plurality of cutter blades 40 disposed beneath the casing 44 as more clearly seen in FIGURE 5. It will be observed that the central sprocket 34 of the cutter assembly 16 as well as the central sprocket 46 of the cutter assembly 18 includes a pair of sprocket wheels driven respectively from rotary flexible shafting 48 and 50. The central pair of sprocket wheels 34 and 46 are drivingly connected with the other sprocket wheels rotatably mounted by the assembly casings 26 and 44 so as to simultaneously rotate all of the rotary cutter blades connected to each of the sprocket wheels. Accordingly, the upper sprocket wheel 34 is drivingly connected to the sprocket wheels 36 and 38 by means of an endless flexible sprocket chain 52 while the lower sprocket wheel below the sprocket wheel 34 in FIGURE 2 is drivingly connected to the sprocket wheels 32 and 30 by means of a second endless sprocket chain 54. The sprocket wheels and rotary cutter blades of the cutter assembly 18 are similarly drivingly interconnected with the pair of sprocket wheels at 46 by means of a pair of sprocket chains 56 and 58 as more clearly seen in FIGURES 1 and 3.

It will be observed that the vehicle frame 14 includes a top portion 60 which tapers at the rear end thereof, said top portion 60 having depending sides 62. The mounting equipment for the cutter assemblies 16 and 18, the control equipment for steering and positioning the cutter assemblies, as well as a seat 64 are mounted above the top portion 60 of the vehicle frame 14, said equipment and seat being so mounted forwardly of the power plant 20. The drive mechanism that drivingly connects the power plant 20 to the propelling wheels 22 and provides the power for operating the cutter assemblies 16 and 18 as well as providing the fluid pressure source for the cutter positioning mechanism, is all mounted beneath the top portion 60 of the vehicle frame 14 as more clearly seen in FIGURE 4.

Referring to FIGURES 1 and 2 it will be observed that the front or forward cutter assembly 16 is adjustably mounted in front of the vehicle frame 14 and extends transversely across the vehicle frame extending beyond the sides thereof. Mounting brackets 64 and 66 are therefore provided and attached to the top portion 60 of the vehicle frame adjacent a forward end thereof. Pivotally mounted at the top of the mounting brackets 64 and 66 are a pair of supporting arms 68 and 70 which are interconnected at their upper ends by a shaft 72 while at their lower ends said arms 68 and 70 are connected to the top 28 of the casing 26 of the forward cutter assembly 16 by means of fasteners 74 and 76 as seen in FIGURE 2. A hydraulic lift cylinder 78 is therefore pivotally connected at 79 to the top 60 of the vehicle frame which cylinder slidably mounts a piston (not shown) therein which is connected to the shaft 72 by means of piston rod 80. Accordingly, movement of the piston rod 80 within the cylinder 78 will pivot the arms 68 and 70 on the mounting brackets 64 and 66 to thereby lift or lower the cutter assembly 16 about an axis parallel to and spaced above the vehicle frame 14. As more clearly seen in FIGURE 2, a pair of fluid conduits 82 and 84 are connected to both ends of the hydraulic cylinder 78 for hydraulic actuation of the piston within the hydraulic cylinder 78. The fluid conduits 82 and 84 are accordingly connected to a valve control box 86 which may be selectively operated by the operator of the machine for supplying hydraulic fluid to the hydraulic cylinder 78 either through conduit 82 or conduit 84 for positioning the forward cutter assembly 16. It will therefore be observed that the valve control box 86 is positioned adjacent to the operator's seat 64.

With regard to the adjustable mounting of the cutter assembly 18, it will be observed in FIGURES 1 and 2 that mounting members 88 and 90 are provided which are connected at an apex to a pivot bracket 92. The mounting arms 88 and 90 are therefore braced by means of a bracing member 94 so as to provide a rigid mounting structure securely attached to the top 60 of the vehicle frame 14. A mounting arm or boom 96 is pivotally connected to the pivot bracket 92 and extends laterally away from the vehicle frame. A tubular suspension member 98 is rotatably connected to the lateral outer end of the mounting arm 96 by any suitable rotatable connection well known to those skilled in the art and has attaching arms 100 and 102 connected to the bottom thereof, said attaching arms 100 and 102 being pivotally connected to the casing 44 of the cutter assembly 18 by means of a pair of pivot brackets 104 and 106 attached to the top of the cutter casing 44. It will be observed that the pivot brackets 104 and 106 pivotally support the cutter assembly 18 about an axis which is perpendicular to and intersects the rotational axis of the tubular member 98 so that the cutter assembly 18 may be pivotally adjusted relative to the supporting arm 96 about two axes which are disposed perpendicular to and intersecting each other. The mounting arm 96 is pivotally adjustable relative to the vehicle frame 14 by means of pivot bracket 92 so as to further pivotally adjust the cutter assembly 18 about a third axis. It will therefore be appreciated that the side cutter assembly 18 includes mounting structure enabling it to be pivotally adjusted upwardly and downwardly by means of the pivot bracket 92 so as to vary the depth of cut while the cutter assembly 18 may also be pivotally adjustable in a horizontal plane about the rotational axis through the tubular member 98 at any inclination with respect to the side of the vehicle frame 14 so as to vary the swath of the cut by the cutter assembly 18 as the vehicle is moved forwardly. The cutter assembly 18 is also pivotally adjustable about the pivot axis through the pivot brackets 104 and 106 so as to tilt the cutter assembly 18 for accommodating ditches and embankments or any slope of the terrain being traversed by the cutter assembly 18. In connection with the above, it will also be observed that skid elements 108 are attached to both ends of the cutter assembly 18 in order to yieldably support the cutter assembly 18 on the irregular ground over which it may move since the skid elements will be elastically deformed under load when maintaining the assembly in spaced relation above the ground surface.

In order to pivotally adjust the supporting arm 96 relative to the supporting structure on the vehicle frame, a hydraulic lift cylinder 110 is provided as more clearly seen in FIGURES 1 and 3. The hydraulic cylinder 110 is therefore pivotally connected at 111 to the top 60 of the frame 14 while the piston rod 112 thereof is pivotally connected at 113 to the arm 96. A pair of fluid conduits 114 and 116 are therefore also provided and connected to both ends of the hydraulic cylinder 110, said fluid conduits being connected to the valve box 86 for control of the hydraulic cylinder 110. Accordingly, the cutter assembly 18 may be pivotally raised or lowered as desired upon actuation of the hydraulic cylinder 110 and piston 112.

In order to vary the cutting inclination of the cutter assembly 18 relative to the side of the vehicle frame 14 so as to vary the swath cut by the cutter assembly 18 alongside of the vehicle frame, a piston cylinder 118 is provided as more clearly seen in FIGURE 2. Slidably disposed within the cylinder 118 is a piston connected to piston rod 120 which is pivotally connected to a crank arm 122 which is connected to the tubular member 98 which is rotatably mounted by the supporting arm 96 at its outer end. Accordingly, fluid supplied to the cylinder 118 by means of hydraulic conduits 124 and 126 connected to the valve box 86 may control the inclination of the cutter assembly 18 with respect to the vehicle frame 14.

In order to vary the cutting banking angle of the cutter assembly 18 a third hydraulic cylinder 128 is provided for the cutter assembly 18, said hydraulic cylinder 128 being pivotally connected at 129 to the casing 44 of the cutter assembly whereas the cylinder 118 had been pivotally connected at 119 to the supporting arm 96. A piston rod 130 therefore extends outwardly from the hydraulic cylinder 128 and is pivotally connected at 99 to the tubular member 98 so that the cutter assembly 18 may be pivotally adjusted relative to the tubular member 98 about a pivot axis extending through the pivot brackets 104 and 106 in order to vary the banking angle of the cutter assembly 18. Accordingly, a pair of hydraulic conduits 130 and 132 as more clearly seen in FIGURE 3 are provided and are connected to the cylinder 128 and to the valve control box 86.

Referring now to FIGURE 2, it will be observed that the hydraulic conduits are supplied with fluid through the valve control box 86 for operating the hydraulic cylinder 78 for tilting upwardly or downwardly the forward cutter assembly 16 relative to the vehicle frame, for operating the cylinder 110 for raising or lowering the cutter assembly 18 relative to the ground, for operating the cylinder 118 for varying the inclination of the cutter assembly relative to the vehicle frame by pivotal adjustment thereof relative to the supporting arm 96 and for operating the hydraulic cylinder 128 for varying the banking angle of the cutter assembly 18 by pivotally adjusting it relative to the tubular member 98. Accordingly, any suitable type of hydraulic pump 136 is provided for supplying fluid under pressure to the valve box, said pump being driven by means of a gear box 138 as seen in FIGURE 2. The gear box 138 and pump 136 are therefore mounted on top of the vehicle frame 60 adjacent to the valve control box 86. It will also be observed in FIGURE 2, that a steering control arm 140 is provided in front of the operator's seat 64 said steering arm 140 being connected to a crank arm 142 which is connected by means of a link 144 to a crank arm 146 connected to a steering shaft 148 secured to a mounting bracket 150 for the rear steerable wheel 24. Although a mechanical interconnection is shown for steering the rear wheel 24 it will be appreciated that a hydraulic type of mechanism may be utilized for operatively interconnecting the steering arm 140 to the steerable wheel 24.

It will therefore be appreciated that the drive for the pump gear box 138, which gear box 138 is driven by means of an input pulley 152 as seen in FIGURE 2, and the drive for the rotary flexible shaftings 48 and 50 which drive the sprocket wheels and sprocket chains for rotating the cutter blades 40, will be provided between the aforesaid flexible rotary shaftings and gear box drive pulley 152 and the power plant 20. Accordingly a transmission arrangement for such purpose is disposed beneath the vehicle frame as seen in FIGURE 4. A transmission 154 is provided for drivingly connecting the power plant 20 to the propelling wheels 22 by means of a propeller shaft 156 which is drivingly connected to the propelling wheels 22 by means of a differential 158. A power take-off shaft 160 is also driven from the transmission 154 for the purposes of driving the flexible rotary shaftings 48 and 50 and the input pulley 152 for the pump gear box. Accordingly, pulley wheels 162, 164 and 166 are provided on the power take-off shaft 160. The pulley wheel 162 is drivingly connected to the flexible rotary shafting 50 by means of a flexible endless belt 168 trained around the pulley 162 and about a pulley wheel 170 connected to the rotary shafting 50. The pulley wheel 164 is drivingly connected to the rotary shafting 48 by means of an endless belt 172 trained around a pulley wheel 174 connected to the rotary shafting 48. The pulley 166 is drivingly connected by means of belt 176 to a pulley 178 which is drivingly connected to the input pulley 152 for the pump gear box 138. It will therefore be appreciated that by providing the aforesaid drive transmission mechanisms beneath the vehicle frame, the center of gravity of the vehicle may be made as low as possible which is of particular concern for this type of machine wherein the extensive nature of the cutter assemblies would tend to cause tilting of the vehicle frame.

Operation of the mowing machine will therefore be apparent from the foregoing description. It will therefore be appreciated that the machine includes an adjustable cutter assembly which extends laterally beyond the sides of the machine frame for cutting a large swath of grass while a side cutter assembly is provided which is adjustable in three perpendicular planes for accommodating the different requirements and irregularities of the terrain, said side cutter assembly also overlapping the swath cut by the forward cutter assembly so as to provide one continuous and large swath of grass cut by the mower. It will also be observed that the arrangement of the blades enables the cutter assemblies to be readily repaired by removal of a damaged blade without complete disassembly of the entire machine. Further, the machine being supported by a three-wheel supporting assembly with the rear wheel being steerable, easy manueverability for the mowing machine is made possible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mowing structure for a vehicle having a pair of forward traction wheels and a rear dirigible wheel comprising in combination: an elongated frame having; a pair of laterally spaced side portions adapted to be located along and outside of said traction wheels of the vehicle, a front portion fixed to said side portions and positioned forwardly of the vehicle, a rear portion attached to said side portions rearwardly of the vehicle mounting said rear dirigible wheel, a supporting structure secured to said side, front and rear portions; a plurality of cutter assemblies pivotally supported by said supporting structure in laterally overlapping relation to each other for up and down height positioning movement relative to the frame, suspension means pivotally connected centrally to one of said cutter assemblies about a horizontal banking axis laterally spaced from one of the side portions, boom means pivotally supported by the supporting structure in spaced relation thereabove and having a laterally projecting end rotatably mounting the suspension means about a vertical swath adjustment axis intersecting the banking axis centrally of said one cutter assembly, first power operating means mounted on said supporting structure for imparting height positioning movement to the boom means, second power operating means operatively mounted on said one cutter assembly to impart movement thereto about said banking axis, third power operating means mounted on said boom means for imparting movement thereto about said swath adjustment axis, power transmission means mounted by the supporting structure and operatively connected to the cutter assemblies for transmitting power thereto and means operatively connecting the power transmitting means to the power operating means for selective operation thereof.

2. The combination of claim 1, wherein another of said cutter assemblies is disposed forwardly of said front portion and extends laterally beyond the side portions in overlapping relation with said one cutter assembly.

3. The combination of claim 1 wherein said one cutter assembly includes, an elongated casing to which the suspension means is pivotally connected, rotary cutter means mounted below said casing, cutter drive means mounted on the casing and operatively connected to the power transmission means substantially at the intersection of said banking and swath adjustment axes for operating the rotary cutter means for all adjusted positions of the casing, and ground engaging skids connected to the casing at opposite longitudinal ends thereof.

References Cited in the file of this patent

UNITED STATES PATENTS

| | | |
|---|---|---|
| 2,299,859 | Speiser | Oct. 27, 1942 |
| 2,672,000 | Speiser | Mar. 16, 1954 |
| 2,732,675 | Smith et al. | Jan. 31, 1956 |
| 2,791,081 | Allen et al. | May 7, 1957 |
| 2,936,561 | Grimes | May 17, 1960 |
| 2,974,469 | Smith et al. | Mar. 14, 1961 |
| 2,997,835 | Stewart | Aug. 29, 1961 |
| 3,034,274 | Webb | May 15, 1962 |
| 3,040,502 | Smith et al. | June 26, 1962 |
| 3,061,996 | Ripps | Nov. 6, 1962 |